US006816856B2

(12) United States Patent
Baskins et al.

(10) Patent No.: US 6,816,856 B2
(45) Date of Patent: *Nov. 9, 2004

(54) SYSTEM FOR AND METHOD OF DATA COMPRESSION IN A VALUELESS DIGITAL TREE REPRESENTING A BITSET

(75) Inventors: Douglas L. Baskins, Fort Collins, CO (US); Alan Silverstein, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 248 days.

This patent is subject to a terminal disclaimer.

(21) Appl. No.: 09/874,468

(22) Filed: Jun. 4, 2001

(65) Prior Publication Data

US 2003/0061189 A1 Mar. 27, 2003

(51) Int. Cl.[7] .............................................. G06F 17/30
(52) U.S. Cl. ........................... 707/4; 707/100; 707/201; 710/129; 710/132
(58) Field of Search ................................ 707/1, 3, 6, 5, 707/7, 4, 100, 201; 710/129, 132; 395/601, 611, 612, 616, 800.11

(56) References Cited

U.S. PATENT DOCUMENTS

| 5,530,957 | A | | 6/1996 | Koenig |
| 5,553,284 | A | | 9/1996 | Barbara et al. |
| 5,557,786 | A | | 9/1996 | Johnson, Jr. |
| 5,664,172 | A | * | 9/1997 | Antoshenkov .................. 707/4 |
| 5,701,467 | A | * | 12/1997 | Freeston ...................... 707/100 |
| 5,758,353 | A | * | 5/1998 | Marquis ...................... 707/201 |
| 5,829,004 | A | | 10/1998 | Au |
| 5,857,196 | A | | 1/1999 | Angle et al. |
| 5,930,805 | A | | 7/1999 | Marquis |
| 5,974,411 | A | | 10/1999 | McCool et al. |
| 5,987,468 | A | * | 11/1999 | Singh et al. .................. 707/100 |
| 6,067,574 | A | | 5/2000 | Tzeng |
| 6,470,344 | B1 | * | 10/2002 | Kothuri et al. .............. 707/100 |
| 6,505,206 | B1 | * | 1/2003 | Tikkanen et al. ........... 707/101 |
| 6,654,760 | B2 | * | 11/2003 | Baskins et al. .............. 707/101 |

FOREIGN PATENT DOCUMENTS

WO        WO 00/75805      12/2000

OTHER PUBLICATIONS

Horowitz, Ellis and Sahni Sartaj, "Fundamentals of Data Structure in Pascal," W.H. Freeman and Company, 4th Ed., New York. (1994) 582–595.
Knuth, Donald E., "The Art of Computer Programming," Addison–Wesley Publishing Company. Reading, MA. (1973) 490–493.
Sedgewick, Robert. "Algorithms in C," Addison–Wesley Publishing Company, Reading, MA. (1990) 245–258, 265–271, 373–386.
Acharya, Anurag, Huican Zhu, and Kai Shen. "Adaptive Algorithms for Cache–efficeint Trie Search." University of California, Santa Barbara, CA. 1–11.
Bentley, Jon and Robert Sedgewick. "Fast Algorithms for Sorting and Searching Strings." 360–369.
Bentley, Jon and Robert Sedgewick. "Ternary Search Trees." Dr. Dobb's Journal. (Apr. 1998) 1–8.

(List continued on next page.)

Primary Examiner—Charles Rones

(57) ABSTRACT

An adaptive digital tree data structure incorporates various codes within the parent pointers to indicate the state of the underlying subexpanses. The use of these codes reduces the amount of memory used in storage for the subexpanses and improves the overall efficiency of the system. The structure of the system is flexible so that if values stored within a fully populated expanse are removed, the adaptive digital tree data structure will adopt the most memory efficient representation of the structure available.

21 Claims, 11 Drawing Sheets

OTHER PUBLICATIONS

Ai–suwaiyel, M. and Ellis Horowitz. "Algorithms for Trie Compaction." ACM Transactions on Database Systems, vol. 9, No. 2. (Jun., 1984) 243–263.

Doeringer, Willibald, Gunter Karjoth and Mahdi Nassehi. "Routing on Longest–Matching Prefixes." IEEE/ACM Transactions on Networking, vol. 4, No. 1. (Feb. 1996). 86–97.

Reznik, Yuriy, A. "Some results on Tries with Adaptive Branching." 6th Annual International Conference, COCOON (2000) 148–158.

Knott, Gary D. "Fixed–Bucket Binary Storage Trees" Journal of Algorithms 3, (1982) 276–287.

Luccio, Fabrizio, Mirelle Regnier, Rene Schott. "Discs and Other Related Data Structure," Workshop WADS. (Aug. 1989). 192–205.

Clement, J. P. Flajolet, and B. Vallee. "Dynamical Sources in Information Theory: A general Analysis of Trie Structures," Algorithmica. (2001). 307–369.

http://www.geocities.com/SiliconValley/4942/arrays.html—Dynamic Array Routines (6 Pages) (printed Jul. 18, 2001).

European Search Report issued for EP 02 25 3372, dated Mar. 25, 2004.

Merrett, T. H., Heping Shang, and Xiaoyan Zhao. "Database Structures, Based on Tries, for Text, Spatial, and General Data." School of COmputer Science, McGill University. 1–11.

Bentley, Jon L. "Multidimensional Binary Search Trees Used for Associative Searching." Association for Computing Machinery, Inc. Vo. 18. No. 9. (Sep. 1975) 509–517.

Jacquet, Philippe and Wojciech Szpankowski. "What we can learn about Suffix Trees from Independent Tries." WADS. (Aug. 1991). 228–239.

Nilsson, Stefan and Matti Tikkanen. "An experimental study of Compression Methods for dynamic Tries." 1–21.

Martinez, Conrad, et al. "Partial match queries in relaxed multidimensional search trees." Austrian–Spanish Scientific Exchange Program. (Sep. 28, 1998). 1–24.

Rais, Bonita, et al. "Typical Behavior of Patricia Tries." Allerton Conference on Communications, Control, and Computing. (Oct. 1990). 924–925.

Kirschenhofer, Peter, et al. "Do we really need to Balance Patricia Tries?"National Science Foundation. 302–316.

Procopiuc, Octavian. "Data Structures for Spatial Systems."(May 12, 1997). 1–20.

* cited by examiner

| FIG. 1A-1 | FIG. 1A-2 |
|---|---|
| FIG. 1A-3 | FIG. 1A-4 |

FIG. 1A

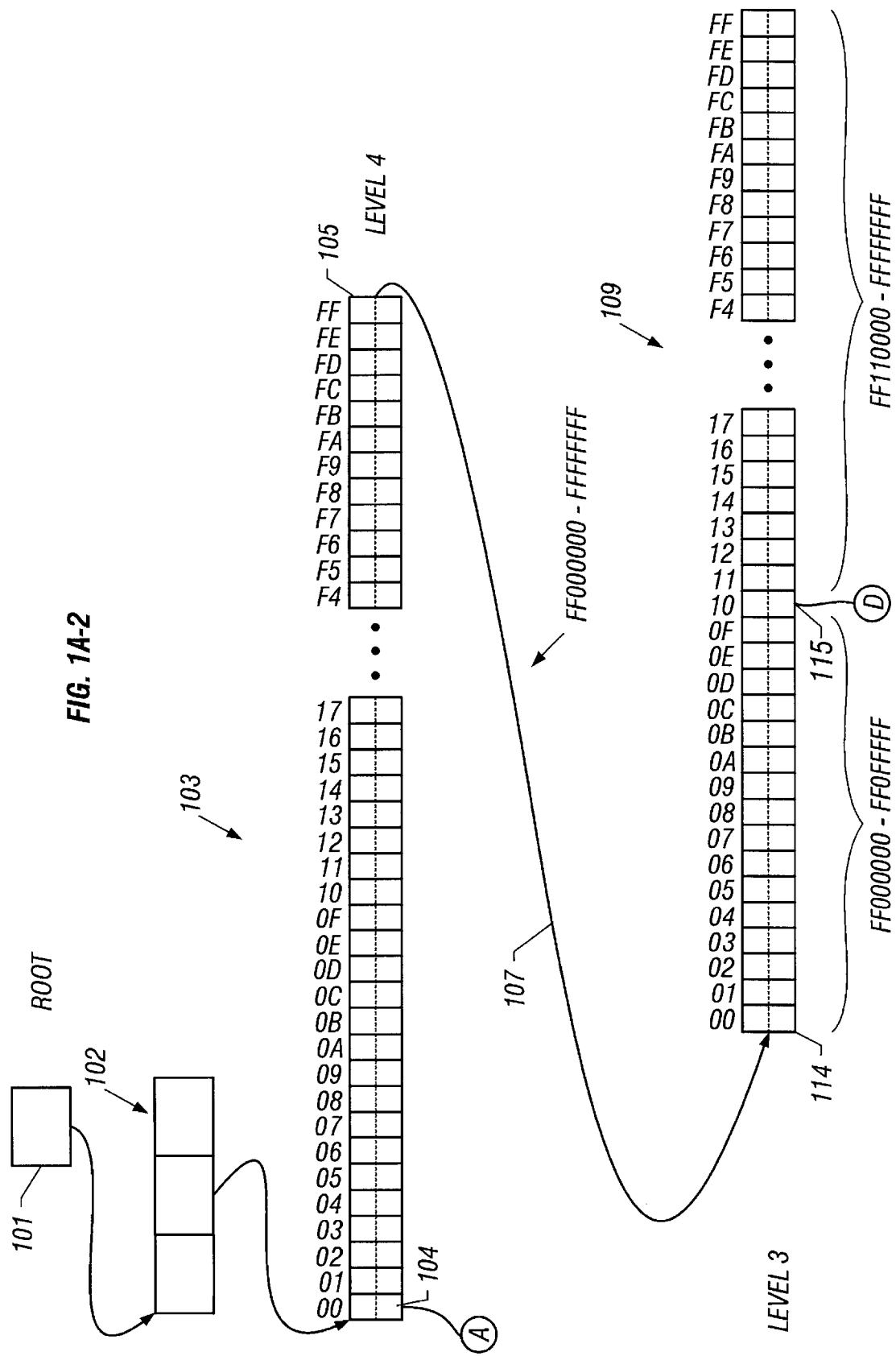

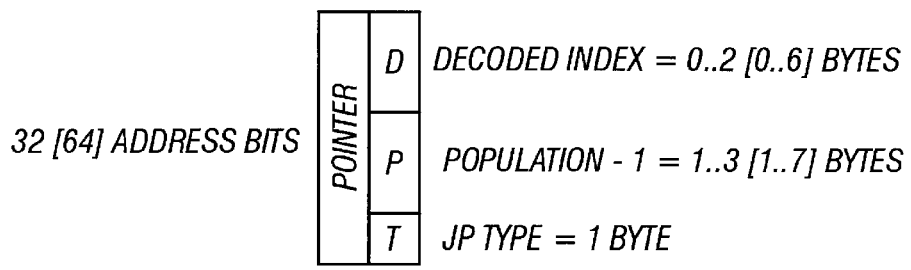
*FIG. 2A*
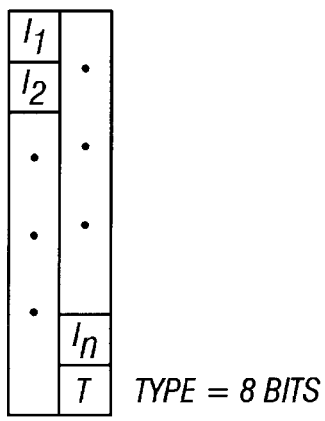
*FIG. 2B*
| NumRP=4 | E1 | E2 | E3 |
|---|---|---|---|
| E4 | | | |
| RICH POINTER FOR EXPANSE 1 (E1) | | | |
| RICH POINTER FOR EXPANSE 2 (E2) | | | |
| RICH POINTER FOR EXPANSE 3 (E3) | | | |
| RICH POINTER FOR EXPANSE 4 (E4) | | | |
| | | | |
| | | | |
| | | | |
*FIG. 3*

4 INDEXES, 3 BYTES EACH:

5 INDEXES, 2 BYTES EACH:

8 INDEXES, 1 BYTES EACH:

9 INDEXES, 1 BYTES EACH:

2 INDEXES, 3 BYTES EACH:

2 INDEXES, 2 BYTES EACH:

7 INDEXES, 1 BYTES EACH:

SYSTEM FOR AND METHOD OF DATA COMPRESSION IN A VALUELESS DIGITAL TREE REPRESENTING A BITSET

RELATED APPLICATIONS

The present application is related to, common assigned, concurrently filed U.S. Pat. No. 6,654,760, entitled "SYSTEM AND METHOD OF PROVIDING A CACHE-EFFICIENT, HYBRID, COMPRESSED DIGITAL TREE WITH WIDE DYNAMIC RANGES AND SIMPLE INTERFACE REQUIRING NO CONFIGURATION OR TUNING"; U.S. patent application Ser. No. 09/874,654 currently pending, entitled "SYSTEM FOR AND METHOD OF EFFICIENT, EXPANDABLE STORAGE AND RETRIEVAL OF SMALL DATASETS"; and U.S. Pat. No. 6,671,694, entitled "SYSTEM FOR AND METHOD OF CACHE-EFFICIENT DIGITAL TREE WITH RICH POINTERS," the disclosures of which are hereby incorporated herein by reference.

TECHNICAL FIELD

The present invention relates generally to the field of data structures, and more particularly to a hierarchical data organization using exception lists of indexes to provide enhanced node compression.

BACKGROUND

Computer processors and associated memory components continue to increase in speed. As hardware approaches physical speed limitations, however, other methods for generating appreciable decreases in data access times are required. Even when such limitations are not a factor, maximizing software efficiency maximizes the efficiency of the hardware platform, extending the capabilities of the hardware/software system as a whole. One method of increasing system efficiency is by providing effective data management, achieved by the appropriate choice of data structure and related storage and retrieval algorithms. For example, various prior art data structures and related storage and retrieval algorithms have been developed for data management including arrays, hashing, binary trees, AVL trees (height-balanced binary trees), b-trees, and skiplists. In each of these prior art data structures and related storage and retrieval algorithms an inherent trade-off has existed between providing faster access times and providing lower memory overhead. For example, an array allows for fast indexing through the calculation of the address of a single array element but requires the pre-allocation of the entire array in memory before a single value is stored, and unused intervals of the array waste memory resources. Alternatively, binary trees, AVL trees, b-trees and skiplists do not require the pre-allocation of memory for the data structure and attempt to minimize allocation of unused memory but exhibit an access time which increases as the population increases.

An array is a prior art data structure which has a simplified structure and allows for rapid access of the stored data. However, memory must be allocated for the entire array and the structure is inflexible. An array value is looked up "positionally", or "digitally", by multiplying the index by the size (e.g., number of bytes) allocated to each element of the array and adding the offset of the base address of the array. Typically, a single Central Processing Unit (CPU) cache line fill is required to access the array element and value stored therein. As described and typically implemented, the array is memory inefficient and relatively inflexible. Access, however, is provided as O(1), i.e., independent of the size of the array (ignoring disk swapping).

Alternatively, other data structures previously mentioned including binary trees, b-trees, skiplists and hash tables, are available which are more memory efficient but include undesirable features. For example, hashing is used to convert sparse, possibly multi-word indexes (such as strings) into array indexes. The typical hash table is a fixed-size array, and each index into it is the result of a hashing algorithm performed on the original index. However, in order for hashing to be efficient, the hash algorithm must be matched to the indexes which are to be stored. Hash tables also require every data node to contain a copy of (or a pointer to) the original index (key) so you can distinguish nodes in each synonym chain (or other type of list). Like an array, use of hashing requires some preallocation of memory, but it is normally a fraction of the memory which must be allocated for a flat array, if well designed, i.e., the characteristics of the data to be stored are well known, behaved and matched to the hashing algorithm, collision resolution technique and storage structure implemented.

In particular, digital trees, or tries, provide rapid access to data, but are generally memory inefficient. Memory efficiency may be enhanced for handling sparse index sets by keeping tree branches narrow, resulting in a deeper tree and an increase in the average number of memory references, indirections, and cache line fills, all resulting in slower access to data. This latter factor, i.e., maximizing cache efficiency, is often ignored when such structures are discussed yet may be a dominant factor affecting system performance. A trie is a tree of smaller arrays, or branches, where each branch decodes one or more bits of the index. Prior art digital trees have branch nodes that are arrays of simple pointers or addresses. Typically, the size of the pointers or addresses are minimized to improve the memory efficiency of the digital tree.

At the "bottom" of the digital tree, the last branch decodes the last bits of the index, and the element points to some storage specific to the index. The "leaves" of the tree are these memory chunks for specific indexes, which have application-specific structures.

Digital trees have many advantages including not requiring memory to be allocated to branches which have no indexes or zero population (also called an empty subexpanse). In this case the pointer which points to the empty subexpanse is given a unique value and is called a null pointer indicating that it does not represent a valid address value. Additionally, the indexes which are stored in a digital tree are accessible in sorted order which allows identification of neighbors. An "expanse" of a digital tree as used herein is the range of values which could be stored within the digital tree, while the population of the digital tree is the set of values that are actually stored within the tree. Similarly, the expanse of a branch of a digital tree is the range of indexes which could be stored within the branch, and the population of a branch is the number of values (e.g., count) which are actually stored within the branch. (As used herein, the term "population" refers to either the set of indexes or the count of those indexes, the meaning of the term being apparent to those skilled in the art from the context in which the term is used.)

"Adaptive Algorithms for Cache-efficient Trie Search" by Acharya, Zhu and Shen (1999) describes cache-efficient algorithms for trie search. Each of the algorithms use different data structures, including a partitioned-array, B-tree, hashtable, and vectors, to represent different nodes in a trie. The data structure selected depends on cache characteristics as well as the fanout of the node. The algorithms further adapt to changes in the fanout at a node by dynamically switching the data structure used to represent the node. Finally, the size and the layout of individual data structures is determined based on the size of the symbols in the alphabet as well as characteristics of the cache(s). The publication further includes an evaluation of the performance of the algorithms on real and simulated memory hierarchies.

Other publications known and available to those skilled in the art describing data structures include *Fundamentals of Data Structures in Pascal*, 4th Edition; Horowitz and Sahni; pp 582–594; *The Art of Computer Programming*, Volume 3; Knuth; pp 490–492; Algorithms in C; Sedgewick; pp 245–256, 265–271; "Fast Algorithms for Sorting and Searching Strings"; Bentley, Sedgewick; "Ternary Search Trees"; 5871926, INSPEC Abstract Number: C9805-6120-003; Dr Dobb's Journal; "Algorithms for Trie Compaction", ACM Transactions on Database Systems, 9(2):243–63, 1984; "Routing on longest-matching prefixes"; 5217324, INSPEC Abstract Number: B9605-6150M-005, C9605-5640-006; "Some results on tries with adaptive branching"; 6845525, INSPEC Abstract Number: C2001-03-6120-024; "Fixed-bucket binary storage trees"; 01998027, INSPEC Abstract Number: C83009879; "DISCS and other related data structures"; 03730613, INSPEC Abstract Number: C90064501; and "Dynamical sources in information theory: a general analysis of trie structures"; 6841374, INSPEC Abstract Number: B2001–03-6110-014, C2001-03-6120-023.

An enhanced storage structure is described in U.S. patent application Ser. No. 09/457,164 filed Dec. 8, 1999, currently pending, entitled "A Fast Efficient Adaptive, Hybrid Tree," (the '164 application) assigned in common with the instant application and hereby incorporated herein by reference in its entirety. The data structure and storage methods described therein provide a self-adapting structure which self-tunes and configures "expanse" based storage nodes to minimize storage requirements and provide efficient, scalable data storage, search and retrieval capabilities. The structure described therein, however, does not take full advantage of certain data distribution situations.

An enhancement to the storage structure described in the '164 application is detailed in U.S. Pat. No. 6,735,595, issued May 11, 2004, entitled "A Data Structure And Storage And Retrieval Method Supporting Ordinality Based Searching and Data Retrieval", assigned in common with the instant application and hereby incorporated herein by reference in its entirety. This latter application describes a data structure and related data storage and retrieval method which rapidly provides a count of elements stored or referenced by a hierarchical structure of ordered elements (e.g., a tree), access to elements based on their ordinal value in the structure, and identification of the ordinality of elements. In an ordered tree implementation of the structure, a count of indexes present in each subtree is stored, i.e., the cardinality of each subtree is stored either at or associated with a higher level node pointing to that subtree or at or associated with the head node of the subtree. In addition to data structure specific requirements (e.g., creation of a new node, reassignment of pointers, balancing, etc.) data insertion and deletion includes steps of updating affected counts. Again, however, the structure fails to accommodate certain data distribution situations.

A further enhancement is described in related U.S. Pat. No. 6,654,760, entitled "SYSTEM AND METHOD OF PROVIDING A CACHE-EFFICIENT, HYBRID, COMPRESSED DIGITAL TREE WITH WIDE DYNAMIC RANGES AND SIMPLE INTERFACE REQUIRING NO CONFIGURATION OR TUNING", the disclosure of which is hereby incorporated herein by reference. The application describes a syst and data structure including a self-modifying data structure based on a digital tree (or "trie") data structure which is stored in the memory, can be treated as a dynamic array, and is accessed through a root pointer. For an empty tree, this root pointer is null, otherwise it points to the first of a hierarchy of branch nodes of the digital tree. Low-fanout branches are avoided or re laced with alternative structures that are less wasteful of memory while retaining most or all of the performance advantages of a conventional digital tree structure, including index insertion, search, access and deletion performance. Thus, in addition to n-way branches implemented by arrays of n pointers (uncompressed branches), the disclosure describes linear branches for small populations wherein pointers to populated subexpanses are identified in a list arrangement (i.e., linear branches), and, for higher populations, bit vector identifies populated subexpanses, pointers to the populated subexpanses following the bit vector (i.e., bitmap branches). Similar compression is provided for terminal nodes by providing linear and bitmap leaf structures.

The improvements described in this last application reduce or eliminate memory otherwise wasted on null pointers prevalent in sparsely populated and/or wide/shallow digital trees. Further, additional processing time required to effectuate and accommodate the branch modification is minimal, particularly in comparison to processing advantages inherent in reducing the size of the structure so that data fetching from memory is more efficient, capturing more data and fewer null pointers in each CPU cache line fill. Opportunistic reconfiguration of nodes is used to automatically readjust for changing subexpanse population. However, the disclosure fails to address certain data or index distributions that adversely affect data structure storage requirements.

Accordingly, a need exists for techniques and tools to optimize performance characteristics of digital tree and similar structures.

SUMMARY OF THE INVENTION

The present invention is directed to an indexing scheme particularly applicable to data structures, such as digital trees, in which compression techniques are implemented to reduce storage requirements for completely filled and highly populated groups of indexes. These groups of indexes may be stored in a variety of data structures to support data access as required to store and retrieve data and to, for example, traverse a hierarchical data structure such as a digital tree. Thus, in the case of the latter, interior branch and terminal leaf nodes include indications of indexes (or portions of indexes) present in subsidiary nodes (branches) or present in the subject node (leaves.) The invention addresses full and nearly full populations of indexes by providing respective designations of these conditions so as to avoid individually listing the larger number of valid indexes in favor of listing the smaller number of invalid or missing indexes. In the case of a small number of missing indexes, a "nearly full" designation is supplemented by a listing of the missing indexes preferably in an immediate listing within a branch or, if the list is too large, in an inverse linear leaf node. The invention further encompasses other means of compressing branch and leaf nodes that are particularly applicable to large expanses of indexes so as to minimize node storage requirements while taking into consideration additional processing requirements for node decompression.

BRIEF DESCRIPTION OF THE DRAWINGS

FIG. 2A is a generalized diagram of an adaptable object or "rich pointer";

FIG. 2B is a generalized diagram of a rich pointer incorporating immediate storage of indexes;

DETAILED DESCRIPTION

Figures 1, 1A:
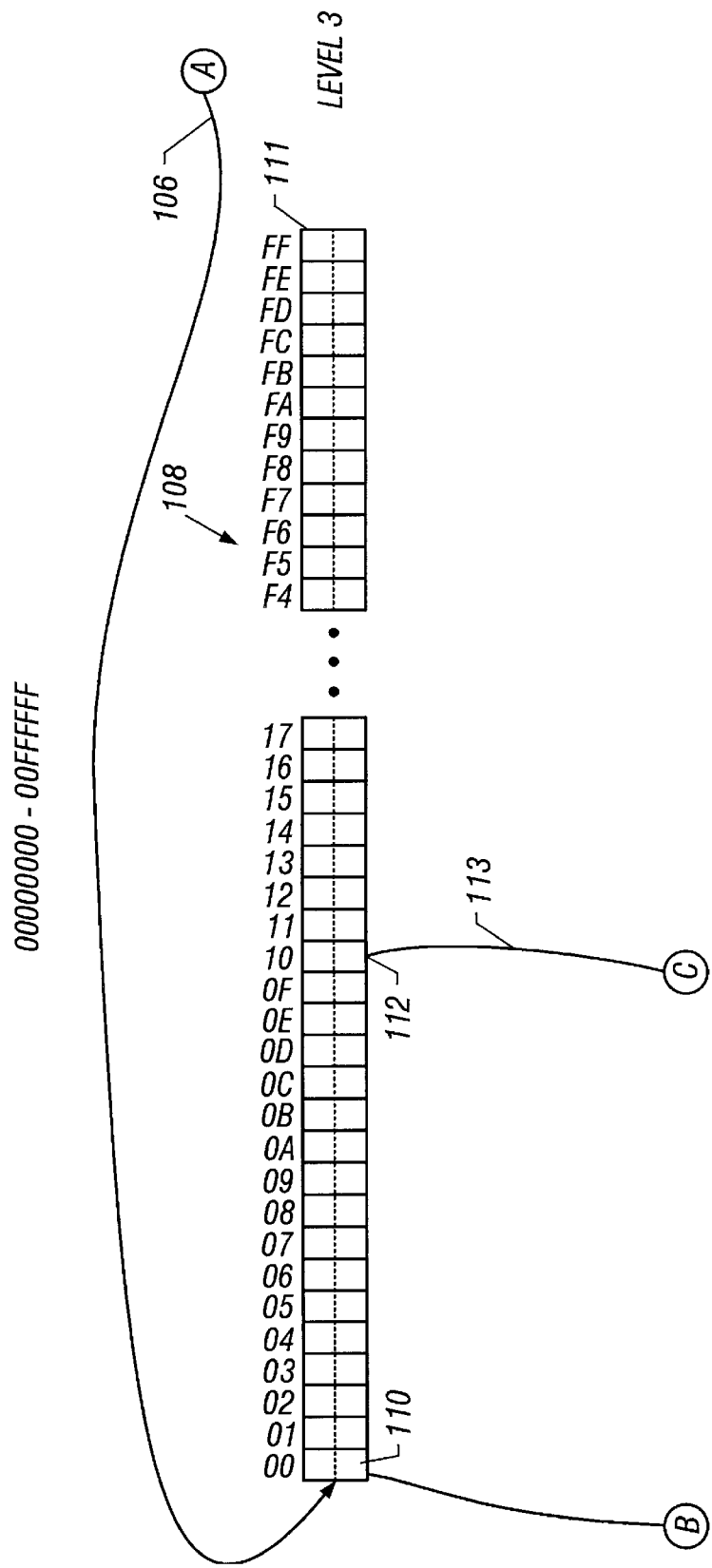
FIG. 1A is a diagram of a hierarchical digital tree structure incorporating pointer structures according to the invention.

As previously described, typical digital trees exhibit several disadvantages. These disadvantages include memory allocated to null pointers associated with empty branches while exhibiting an increased number of memory references or indirections, and possibly cache line fills, as the size (i.e., "fanout" or "degree") of the branches narrows to reduce the number of these null pointers. These disadvantages associated with digital trees have limited their use in prior computer applications. While the related patent disclosures address empty and sparse subexpanses, the present disclosure addresses the other end of the spectrum, i.e., full and nearly full subexpanses encountered as a data structure fills.

The present invention combines the advantages of the digital tree with smarter approaches to handling fall, or nearly fully subexpanses in the tree. These smarter approaches minimize both memory space and processing time, for both lookups and insertions and modifications of data stored in the data structure. Additionally, the present invention ensures the data structure remains space efficient as subexpanses reach their limits. The approaches used by the present invention include forms of data compression and compaction and help reduce the memory required for the data structure, minimize the number of cache line fills required, and reduce access and retrieval times.

When each cell of an array (or an underlying data structure such as a tree that emulates an array at the interface) can contain a single bit, hereinafter called a bit array, compression techniques may be used to reduce the amount of memory used within the array and improve overall memory efficiency. For example, when a subexpanse is fully populated, it may be replaced by a "full notation" in a parent pointer to a subexpanse of the tree. This notation eliminates the need to store values for each cell within the array, that is, subexpanse of the tree.

Similarly, when a subexpanse of a tree is nearly fully populated, memory efficiency may be increased through the use of a inverse ("nearly full") notation and storage of the missing index (key) values. One of ordinary skill in the art would understand that the memory required to represent a subexpanse may be minimized by examining the population of the subexpanses and storing either the indexes present within the subexpanse or storing a "nearly full" notation and representing the missing indexes.

A preferred implementation of the present invention includes a digital tree construct as described in the cited related applications and, in particular, U.S. Pat. No. 6,654,760, entitled "SYSTEM AND METHOD OF PROVIDING A CACHE-EFFICIENT, HYBRID, COMPRESSED DIGITAL TREE WITH WIDE DYNAMIC RANGES AND SIMPLE INTERFACE REQUIRING NO CONFIGURATION OR TUNING," the disclosure of which is hereby incorporated herein by reference. The digital tree described therein includes alternative branch and leaf structures that adapt to the population of the respective subexpanses. In particular, the data structure includes several types of branch and leaf compressions to optimize performance of a digital tree. These constructs include linear and bitmap branches (i.e., interior nodes), linear and bitmap leaves (i.e., terminal nodes), and rules and methods for effectuating use of these nodes including, for example, a global, memory-efficiency-driven, opportunistic decompression of compressed branches, and use of leaf index compression.

Linear branch nodes address low-fanout branches by providing a list of populated subexpanses (i.e., index digits) and corresponding next-level pointers. More generally, a linear branch contains a list of subexpanse subexpanse descriptors that contain criteria for selecting a subexpanse corresponding to a key or one or more of a set of fields constituting a key. For example, the subexpanse descriptors may be 1-byte segments of 32-bit indexes. To maximize memory access efficiency, linear branches may be constrained to a single CPU cache line of the target platform. As the subexpanse becomes more heavily populated, a bitmap branch node may be used including a binary vector indicating which subexpanses are populated (i.e., are not empty) followed by a list of pointers to the populated subexpanses (or an equivalent multi-level data structure).

Linear leaf nodes are likewise directed to low populations of indexes by using multi-index leaves containing lists of valid or, according to one aspect of the present invention, invalid indexes (the latter termed an "inverse linear leaf node") for high populations. While, in the case of linear leaves of valid indexes, the lists may have associated value areas for respective indexes of the multi-index leaves, the converse is not generally applicable to inverse leafs. For medium to high population densities at low levels in the tree, bitmap leaf nodes provide a binary vector of valid indexes, possibly including value areas corresponding to each valid index.

The data structure transitions between node configurations by incorporating global, memory-efficiency-driven, opportunistic decompression of compressed branches. According to this aspect of the data structure, when an entire data set stored in the data structure occupies less memory used per index than some threshold value (possibly measured in bytes per index) or when the population of the subexpanse under a linear or bitmap branch is sufficiently high, even if the global metric is not adequate, linear and/or bitmap branches are replaced with an uncompressed form of the branch (i.e., an uncompressed branch node) resulting in less computation and fewer cache fills to traverse the level, albeit at the cost of some additional memory. Using this option in the case of larger populations of indexes, particularly data having well-clustered indexes, the invention "amortizes" excess memory needed to maintain fast access to the indexes and any related data.

Note the degree of symmetry between branches and leaves, that is, between linear branches and linear leaves and also between bitmap branches and bitmap leaves. This symmetry is most apparent wherein each index is mapped to an associated value. The interior nodes of the tree map portions (digits) of indexes to pointers to subsidiary nodes, while the terminal nodes of the tree map filly decoded indexes to value areas that, in practice, often contain the addresses of, that is, pointers to, caller-defined objects external to the tree. This symmetry fails, however, in that there is no leaf equivalent to an uncompressed branch. When a higher-level leaf exceeds a specific population, it is converted to a subtree under a new branch, or else or to a lower-level, more-compressed leaf (as described below), as appropriate. When a lowest-level linear leaf exceeds a specific population, it is converted to a bitmap leaf.

The invention of the present disclosure is primarily directed to valueless trees, i.e., trees indicating only the presence (i.e. valid) or absence (i.e., invalid) nature of an index. While also applicable to indexes having associated values, the proportionate memory savings realized by storing exception lists rather than valid-index lists is relatively small. This is because memory requirements for leaves having values associated with indexes are driven by the need to provide a value area for at least each valid index regardless of the method of indicating whether an index is or is not valid. Since a valueless tree need only provide an indication of index validity without associating values with the valid indexes, significant memory savings can be achieved by listing only invalid indexes when that list is smaller than the corresponding list of valid indexes or indicating that all indexes are valid by providing a subexpanse full indicator. According to a preferred embodiment of the invention, index validity is indicated by the status or value of a corresponding binary bit, e.g., a value of "0" indicating an invalid index while a value of "1" indicating a valid index. However, such indications might be otherwise represented including, for example, inverting the bit logic, storing a value representing index status, etc.

According to a feature of the digital tree described in the referenced related applications, the fact that a portion of a target index is decoded at each level of a digital tree is further leveraged to compress leaf indexes. Because indexes are partially decoded while traversing the tree, only the remaining undecoded portion of each index need be stored in the leaves, the number of bits or bytes constituting this undecoded portion shrinking at each lower level. The result is that a lower-level leaf (i.e., a leaf more distant from the root) stores more indexes in the same space as a higher level leaf, the latter requiring more bits to represent the larger undecoded portion of each index. Hence, even worst-case index insertions and deletions are localized and do not cascade more than one level down or up the tree, respectively, minimizing worst-case insertion and deletion times. Note that this type of compression is most applicable to fixed-size indexes but less useful for variable-size indexes such as character strings or bit strings.

It should be noted that it is possible to compress a digital tree such that bits common to multiple keys (indexes) are skipped (not represented). Such trees must store copies of whole keys, of whatever fixed or variable size, in their leaf nodes to disambiguate the leaves (except in rare cases in which disambiguation is not required). This is distinguishable from leaf compression as employed according to a preferred embodiment, wherein decoded portions of indexes, whether required for tree traversal or skipped (compressed out) as being common to all indexes in a subexpanse, are always stored in and recoverable from the branch nodes and need not be stored in leaf nodes.

The digital tree of the present disclosure provides an appropriate combination (hybrid) of various cache-efficient ADTs for branches and leaves, the combination depending upon an unpredictable data set (indexes or keys) to be stored in one instance, and results in a wide digital tree that is both memory-efficient and fast to access or modify over a wide dynamic range. A wide dynamic range means over small to large data sets: few to many (billions of) indexes or keys; and types of data sets: indexes or keys that are sequential, clustered, periodic, or random. A well-designed hybrid digital tree with a wide dynamic range can be represented at the software interface as a simple dynamic array with no initialization, tuning, or configuration necessary (or even possible). While the present disclosure introduces the use of fall and nearly-full subexpanse designators and constructs, it can be advantageously combined with the above described pointer and compression techniques and objects to provide a further enhanced data storage structure.

FIG. 1 illustrates the use of "full" and "nearly-full" designators within the context of a digital tree, as more fully described below, following a discussion of FIGS. 2-9. Thus, the invention may be implemented using a wide range of constructs for traversing a data structure including pointers and other schemes for linking nodes and/or providing for traversal of the data structure. For purposes of illustration, a preferred embodiment of the invention may be implemented within a construct of a digital tree including an enhanced pointer as fully described in U.S. Pat. No. 6,671,694, entitled "SYSTEM FOR AND METHOD OF CACHE-EFFICIENT DIGITAL TREE WITH RICH POINTERS," the disclosure of which is hereby incorporated herein by reference.

Such a pointer may take a first form as shown in FIG. 2A when used as a null pointer or to point to a branch or leaf node, or as shown in FIG. 2B when containing immediate indexes. Use of rich pointers provides for designation of the type of object being pointed to, e.g., linear or bitmap, branch or leaf, etc. Alternate embodiments of the invention may use other constructs such as conventional pointers and, for example, use the least significant bits of the pointer itself (recognizing that the pointers might point to 8-byte-aligned objects so that the least significant three bits are not otherwise used) to identify the target object, or provide that the pointed-at object self-identify (that is, type information is stored in the child node rather than in the parent).

As shown in FIG. 2A, the basic pointer structure on, for example, a 32-bit platform, includes two 32-bit words, one entire word used by a pointer to redirect tree traversal flow to another node, a Decoded Index of between zero and 2 bytes, a Population field of between 1 and 3 bytes, and a Type field of 1 byte. For a null pointer, all bytes except the Type field are zero. Otherwise, the first word is a pointer to a subsidiary branch or leaf node. The Decode and Population fields together fill all but 1 byte of the second word.

A pointer construct containing immediate indexes is shown in FIG. 2B, eliminating the need to redirect or point to another node to access the indexes. As explained in the referenced patent application, still other variations of these pointer constructs may be used to associate values with respective indexes, while adaptations are provided to accommodate various machine word sizes.

Rich pointers are used to form ADTs including branches, i.e., interior nodes and leaves, i.e., terminal nodes. According to this data structure, a digital tree includes some combination of branch nodes (linear, bitmap or uncompressed) and leaf nodes (linear or bitmap). Each branch is a literal (uncompressed) or virtual (linear or bitmap) array of pointers, preferably 256 such rich pointers. That is, each node has a fanout of up to 256 subexpanses.

Indexes are preferably decoded 8 bits, that is 1 byte, at a time. In other words, each digit is 1 byte, and the real or virtual fanout of each branch node is 256. It should be apparent to one of ordinary skill in the art that a digital tree can have any fanout in its branch nodes, even fanouts which are not a power of 2, such as 26 when the tree decodes a simple 26-character alphabet. A binary tree is normally a divide-by-population tree (referred to as a binary storage tree) in which keys are compared with whole key values stored in each node. However, a binary tree can also be a divide-by-expanse (binary digital) tree with a fanout of 2 in which each digit is 1 bit. Furthermore, a hybrid tree may have varying fanouts at different branches or levels. However, it has been found that a consistent fanout of 256, that is, a digit size of 1 byte, is generally most efficient because computers naturally process byte-sized objects efficiently, in addition to word-sized objects.

Compressed branches include linear and bitmap, supplementing the uncompressed type branch. This latter branch type supports conventional digital tree functions using, for example, an array of 256 subexpanse pointers. When the actual fanout (i.e., number of populated subexpanses) is relatively limited, as is typically true when a new branch is created during index insertion, a "compressed" branch is instead used. This compressed branch may be viewed as a virtual array of 256 subexpanse pointers, but requiring much less memory (although often requiring two cache fills to traverse the associated node rather than one for reasons explained below.)

A rich pointer may be used to implement a data structure compatible with and further incorporating branch and leaf compression. While not required, use of rich pointers is compatible with and supports one implementation of the present invention. Such a rich pointer structure encompasses at least two types of rich pointers or adaptable objects including a pointer type as described above as depicted in FIG. 2A and an immediate type depicted in FIG. 2B. The immediate type supports immediate indexes. That is, when the population of an expanse is relatively sparse, a rich pointer can be used to store the indexes "immediately" within a digital tree branch, rather than requiring traversal of the digital tree down to the lowest level to access the index. This format is akin to the "immediate" machine instruction format wherein an instruction specifies an immediate operand which immediately follows any displacement bytes. Thus, an immediate index or a small number of indexes are stored in the node, avoiding one or more redirections otherwise required to traverse the tree and arrive at some distant leaf node. Immediate indexes thereby provide a way of packing small populations (or small number of indexes) directly into a rich pointer structure instead of allocating more memory and requiring multiple memory references and possible cache fills to access the data.

A two-word format of the preferred embodiment readily supports the inclusion of immediate indexes. Within the rich pointer, this is accomplished by storing index digits in the entirety of the rich pointer excepting the type field. A rich pointer implemented in a 32-bit system may store anywhere from a single 3-byte immediate index up to seven 1-byte indexes, while a rich pointer in a 64-bit system may store up to 15 1-byte immediate indexes. The generalized structure of a rich pointer (also referred to as an adaptable object) supporting immediate indexes is shown in FIG. 2B. The rich pointer includes one or more indexes "I", depending on the word-size of the platform and the size of the index, and an 8-bit Type field that also encodes the index size and the number of immediate indexes.

Figures 1, 1A, 2, 3:
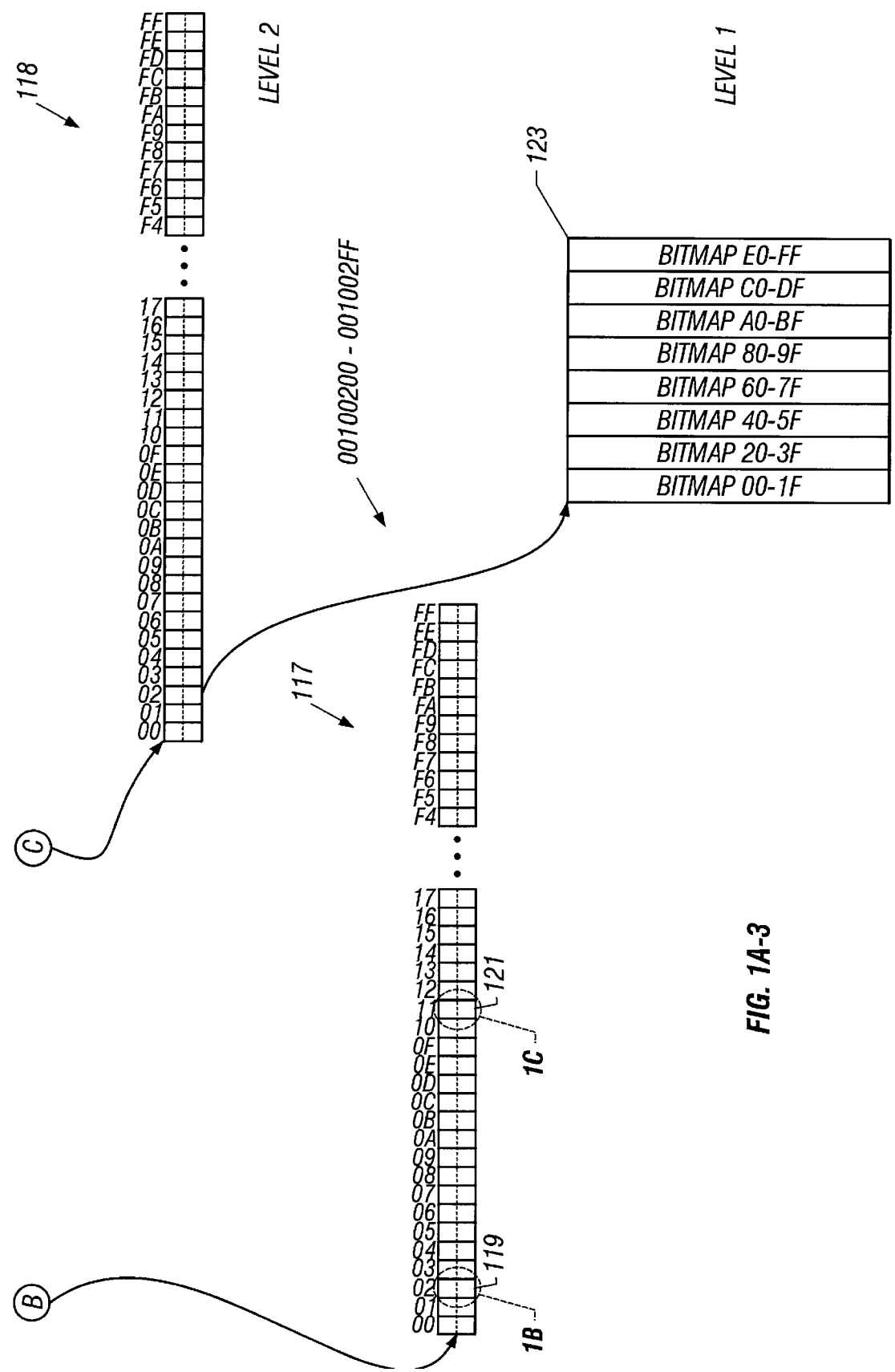
FIG. 3 is a diagram of an example of a linear branch.

FIG. 3 illustrates details of a linear branch construct according to the invention as implemented on a 32-bit platform. The linear branch consists of one byte indicating the fanout, i.e., number of populated subexpanses referenced by the branch (NumRP), followed by a sorted array consisting of 1 byte (i.e., digit) per populated subexpanse indicating the subexpanse number (e.g., 0 through 255). The number of populated subexpanses is followed by a corresponding array of subexpanse pointers. The invention incorporates some padding at the end of the two arrays which allows them to "grow in place" for faster insertions and deletions. Both of the subexpanse arrays (i.e., digits and pointers) are organized or packed purely by population, not addressed uniformly by expanse but can be thought of as being organized or accessed by expanse.

Typically, a linear branch node as shown in FIG. 3 is used when the actual fanout, that is, the number of populated subexpanses, is relatively small, for example up to seven rich pointers out of a possible 256 subexpanses per branch. The linear branch node according to one implementation of the invention includes the previously mentioned three consecutive regions, including a count of populated subexpanses, a sorted list of populated subexpanses (1 byte each) and a list of corresponding rich pointers, each two words in length. (As recognized by those of ordinary skill in the art, other configurations of numbers, types, sizes and ordering of regions may be employed in alternative implementations of the invention.) Using this particular scheme, a maximum linear branch including seven rich pointers requires 1 byte for the number of subexpanses and 7 bytes for the subexpanse list, hence two words (on a 32-bit system) for the combination. The combination of count and subexpanse list is followed by fourteen words for the rich pointers themselves, the entire construct fitting in sixteen words or one cache line total. Referring back to FIG. 3, a total of 4 populated subexpanses are referenced by pointers for E[xpanse]1 through E[xpanse]4, respectively.

Figures 1, 1A, 2, 3, 4:
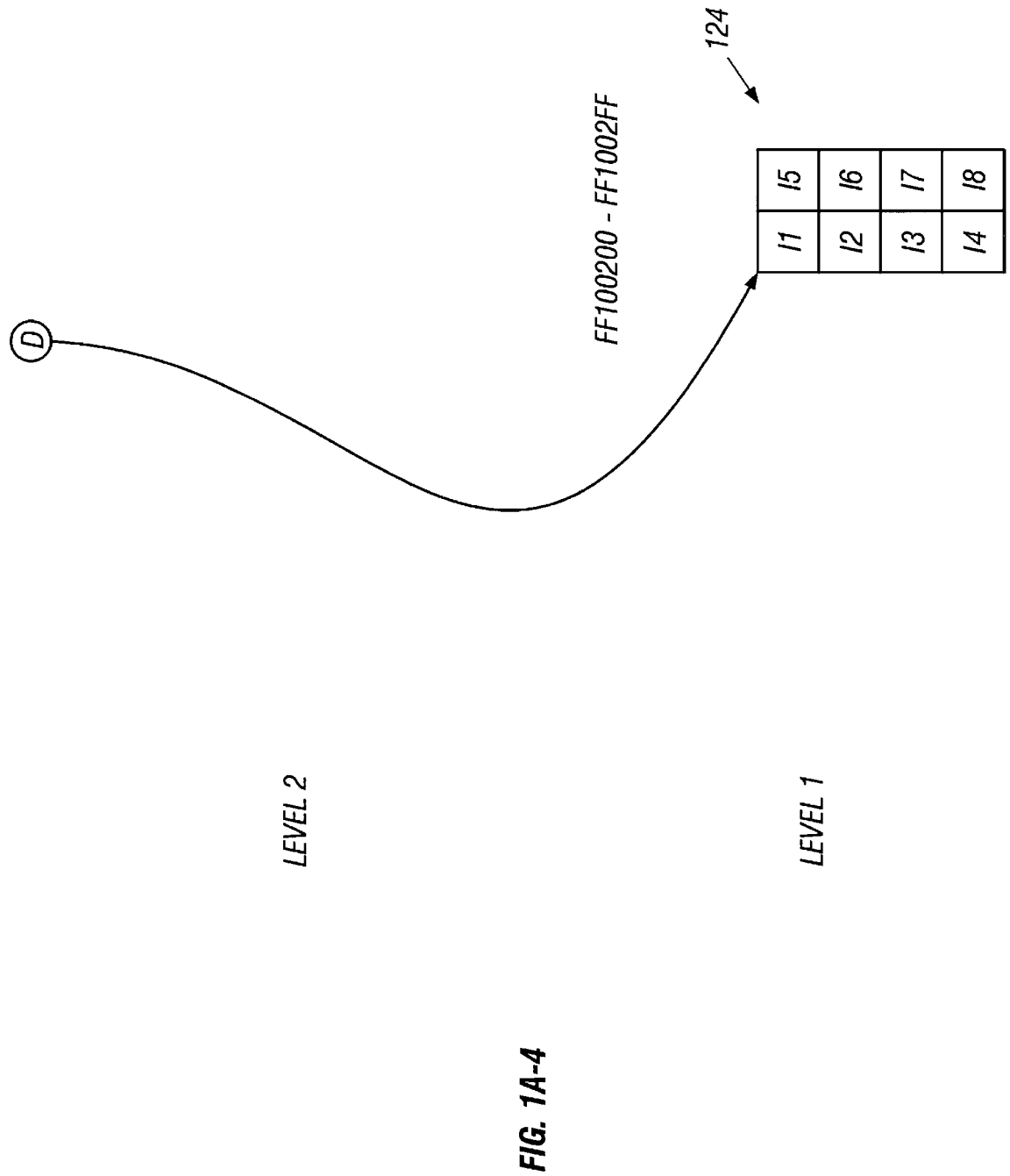
FIG. 4 is a diagram of an example of a bitmap branch.

FIG. 4 illustrates a bitmap branch, again as implemented on a 32-bit word size platform. The bitmap branch node has a first portion 401 including 256 bits (32 bytes) indicating populated and empty subexpanses, followed by a second portion 402 including ordinary pointers to independent subarrays of rich pointers to the populated subexpanses. This construct may be thought of as compressing the byte-per-valid-index required in a linear branch to a bit-per-any-index, a potential savings of up to ⅞, except that a bitmap contains 0 bits for invalid indexes. In concept, the subexpanse pointers are held in a simple array (portion 402) following the bitmap. However, according to a preferred embodiment of the invention, so as to keep memory management simple and insertion and deletion fast, the bitmap may be followed by eight ordinary pointers, each to an independent subarray 408, 409 of between zero and 32 subexpanse pointers. The bitmap is thereby organized by expanse, since it is addressable by the digit (0 . . . 255), while the subexpanse pointers are listed "by population", since the latter are packed into subarrays corresponding only to the bits that are set in the bitmap.

Once any bitmap branch subarray of rich pointers reaches maximum memory usage, that is, a number of pointers (i.e., populated subexpanses) such that the amount of memory allocated to the subarray is sufficient to hold 32 subexpanse pointers, the subarray is made uncompressed to save time during accesses, insertions, and deletions. Uncompressing a rich pointer subarray means setting all of the bits in the corresponding subexpanse of the bitmap, even for subexpanses of indexes which are unpopulated; unpacking the rich pointer subarray to be a simple, positionally-accessed array; and representing unpopulated subexpanses with null rich pointers. When the branch is at one level above the lowest level of the tree, a fully populated subexpanse of indexes is indicated by the appropriate "fall" rich pointer type.

Thus, as shown in FIG. 4, the bitmap branch is a 2-tier object, somewhat more complex than either a linear or uncompressed branch. The first level (portion 401) is the bitmap itself, according to a 32-bit word size implementation of the invention, including 256 bits (32 bytes) subdivided into 8 subexpanses, followed by 8 pointers (portion 402) to second-level ADTs or subarrays (e.g., arrays 408 and 409). Each ADT 400 consists of a packed linear list of rich pointers, one rich pointer for each bit set in the associated bitmap. On a 32-bit system, 8 words are required for the bitmap (32/4) and 8 words for the pointers, for a total of 16 words. This latter total of 16 words is important to system performance as it is equal to one CPU cache line according to a preferred implementation of the invention. Note that on a 64-bit system, only 4 words would be needed for the bitmap, while 8 words would still be needed for the ordinary pointers, so that 4 words are wasted assuming again a 16 word cache line.

For example, bitmap 404 has a hex value of 0000b074, which provides the following binary vector and index values:

still do not exceed some selected, "tunable" value, the branch is opportunistically converted to an uncompressed type. While this wastes some memory on null subexpanse pointers, it ensures a single indirection (and cache fill) to traverse the branch. Note, to support the latter parameter, that is, global memory efficiency, at least in a higher population tree the root pointer may point to an intermediate data structure that stores the total number of bytes used by the tree and the total count of indexes stored in the tree. This intermediate data structure may reside adjacent to the top branch node of the tree or point in turn to the top branch of the tree.

Leaf compression is also utilized in the form of multi-index leaves including the aforementioned linear and bitmap leaf types. To these tools, the present invention adds inverse linear leaf types which list missing (invalid) indexes in an otherwise fully populated subexpanse. Typically, each lookup in one branch of a digital tree reduces the expanse or range of the indexes that can possibly be stored under the next lower subexpanse pointer. Therefore, only the respective unique remaining bits not yet decoded need be stored. As previously explained, when the population (i.e., number of valid indexes) in an expanse is small, it becomes useful to store the indexes in a single object that is sequentially or otherwise immediately searchable, rather than proceeding hierarchically through more tree branches to application-specific leaves, each related to a single index. In its simplest case, an indexes-only leaf is a list of valid indexes or, in the case of inverse linear leaf nodes, invalid indexes.

An optimal size of a leaf is generally relatively small, e.g., less than or equal to two cache lines, i.e., 32 words or 128 bytes on a typical 32-bit word size platform. It has been found that even a serial search of a sorted list of indexes in

TABLE 1

| 5 | 5 | 5 | 5 | 5 | 5 | 5 | 5 | 5 | 5 | 5 | 5 | 5 | 5 | 5 | 5 | 4 | 4 | 4 | 4 | 4 | 4 | 4 | 4 | 4 | 4 | 4 | 4 | 4 | 4 | 4 | 4 |
|---|---|---|---|---|---|---|---|---|---|---|---|---|---|---|---|---|---|---|---|---|---|---|---|---|---|---|---|---|---|---|---|
| F | E | D | C | B | A | 9 | 8 | 7 | 6 | 5 | 4 | 3 | 2 | 1 | 0 | F | E | D | C | B | A | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 1 | 0 | 1 | 1 | 0 | 0 | 0 | 0 | 0 | 1 | 1 | 1 | 0 | 1 | 0 | 0 |

According to this example, the binary vector represented in the bottom row of Table 1 indicates the presence of indexes within subexpanses including subexpanses 42, 44, 45, 46, 4C, 4D and 4F within the range $40_{hex}$ to $5F_{hex}$. The associated ordinary pointer 406 for this range (FIG. 4) points to array 408 which includes individual rich pointers to each of the subexpanses corresponding to the subexpanses indicated by the associated binary vector.

Figure 5:
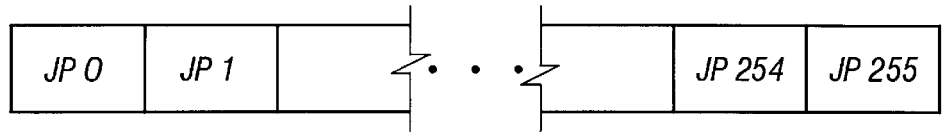
FIG. 5 is a diagram of an uncompressed branch.
Figure 6A:
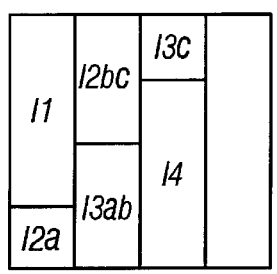
FIGS. 6A-6D are diagrams of examples of linear leaves for structures referencing only indexes.
Figure 6B:
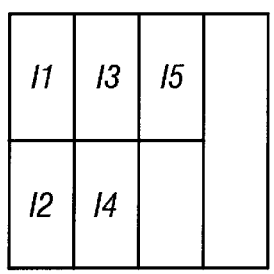
Figure 6C:
Figure 6D:
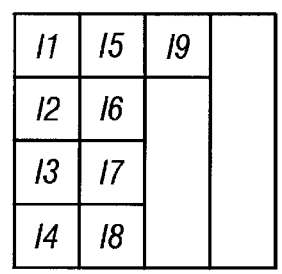

For comparison an uncompressed branch is depicted in FIG. 5. This construct comprises a simple array of rich pointers, in this case 256 such rich pointers, with null rich pointers used to represent empty expanses. Assuming again 2 words per rich pointer, such uncompressed branches require 512 words.

Global memory efficiency is provided such that, when the fanout (i.e., the number of populated subexpanses) increases to a point where a linear branch occupies too many cache lines (e.g. a single 16-word cache line), the linear branch is converted to a bitmap branch. Note that such a bitmap construct can handle "full fanout" and need never be converted to an uncompressed branch. Neither linear nor bitmap branches waste any memory on null subexpanses. However, when the population under a linear or bitmap branch is high enough to "amortize" the memory required for an uncompressed branch, or the overall or global memory efficiency of the data structure (preferably measured in bytes per index)

two full cache lines takes, on average, 1.5 cache fills (assuming that the data is not already in cache), since half of the time the index is found in the first cache line (1 fill) and half the time in the second line (2 fills). That is, when a population is sufficiently small, it has been found that it is preferable to store it as a list, bitmap, or other ADT of indexes in one to two cache lines, rather than in more levels of a digital tree.

FIGS. 6A-6D and 7A-7C show examples of linear leaves. A linear leaf is an ordered list of indexes, each consisting of N undecoded bytes, where N is the level in the tree using a convention wherein the lowest level, i.e., the level furthest from the root, is level 1. (Note that this is opposite of how trees are conventionally described wherein level numbering starts at the topmost node at level 1, each child being at a level numbered higher than a level of its parent.) According to a preferred implementation, the population of the leaf (count of indexes equals the size of the leaf) is stored with the pointer to the leaf, not in the leaf itself (with the exception of an implementation used for very small arrays that consist entirely of a single root-level linear leaf.)

Figure 7A:
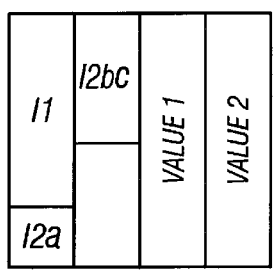
FIGS. 7A-7C are diagrams of examples of linear leaves for structures having values associated with respective valid indexes stored in the structure.
Figure 7B:
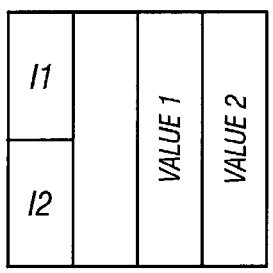
Figure 7C:
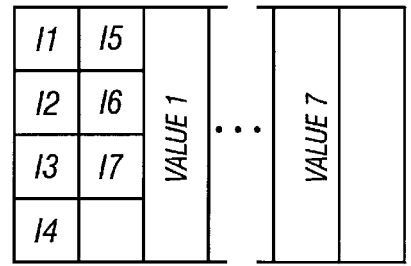

As shown in FIGS. 6A-6D, the linear leaf is a packed array of sorted indexes that stores, for each index, only the minimum number of bytes remaining to be decoded at the level of the leaf in the tree. FIGS. 7A-7C depict alternative implementations used when values are associated with respective indexes, so that a separate value area is added including a list of such values. Also note that, unlike the root-level leaf, the linear leaves need not include a population field for an index count. Instead, the parent node preferably carries the population field. As previously explained, the proportionate memory saved by implementing an inverse linear leaf structure is minimal in the case of indexes having associated values and would not normally be implemented.

Table 2 includes arrangements and capacities of leaves at various levels of a tree (lower level leaves requiring more bytes to represent the remaining portion of the index) for 32 and 64-bit word size platforms, and for systems having values associated with the indexes.

TABLE 2

| Index Only | | Values Associated with Indexes | | |
|---|---|---|---|---|
| 32-bit | [64-bit] | 32-bit | [64-bit] | Index Size |
|  | [3 . . . 36] |  | [2 . . . 34] | [7-byte indexes] |
|  | [3 . . . 42] |  | [2 . . . 36] | [6-byte indexes] |
|  | [4 . . . 51] |  | [2 . . . 39] | [5-byte indexes] |
|  | [4 . . . 64] |  | [2 . . . 42] | [4-byte indexes] |
| 3 . . . 42 | [6 . . . 85] | 2 . . . 36 | [3 . . . 46] | 3-byte indexes |
| 4 . . . 64 | [8 . . . 128] | 2 . . . 42 | [4 . . . 51] | 2-byte indexes |
| 8 . . . 24 | See text | 4 . . . 25 | [8 . . . 25] | 1-byte indexes |

Note that, in each case, the index size of a leaf, i.e., the number of remaining undecoded bytes in each index, is enumerated in the Type field of the referencing rich pointer structure. The minimum leaf populations are based on how may indexes an immediate rich pointer can hold so that smaller populations are "immediatized", i.e., stored in the rich pointer structure itself. In contrast, the maximum leaf populations are limited by the capacity of two cache lines (e.g., 32 words) in the case of index-only leaves, or four cache lines (e.g., 64 words) in the case of leaves in which values are associated with indexes. On a 64-bit platform, an indexes-only leaf may be reconfigured from an immediate indexes type directly to a bitmap leaf upon reaching sixteen indexes so as to avoid creating a linear leaf for a single population size and then a bitmap leaf upon the next insertion, reaching seventeen indexes, in the same subexpanse.

Bitmap leaves are useful when the memory cost of a linear leaf exceeds a particular threshold, for example, upon reaching the aforementioned 17 indexes. Thus, at the lowest level of the tree, where there is only a single index digit (e.g., byte) remaining to decode, a 256-index subexpanse has sufficient population (e.g., 17 indexes), memory is conserved by representing the leaf as a bitmap with 1 bit for each index in the subexpanse, hence 256 total bits or 32 bytes. An example of an indexes-only bitmap leaf implemented on a 32-bit word platform is presented in FIG. 8. In the figure, each horizontal rectangle represents one word. On a 64-bit platform, the leaf would appear similar except that the words are larger and there are half as many words in the bitmap. The bits in the bitmap indicate which of the possible indexes in the expanse of the leaf are actually present, that is, stored.

Figures 8, 9:
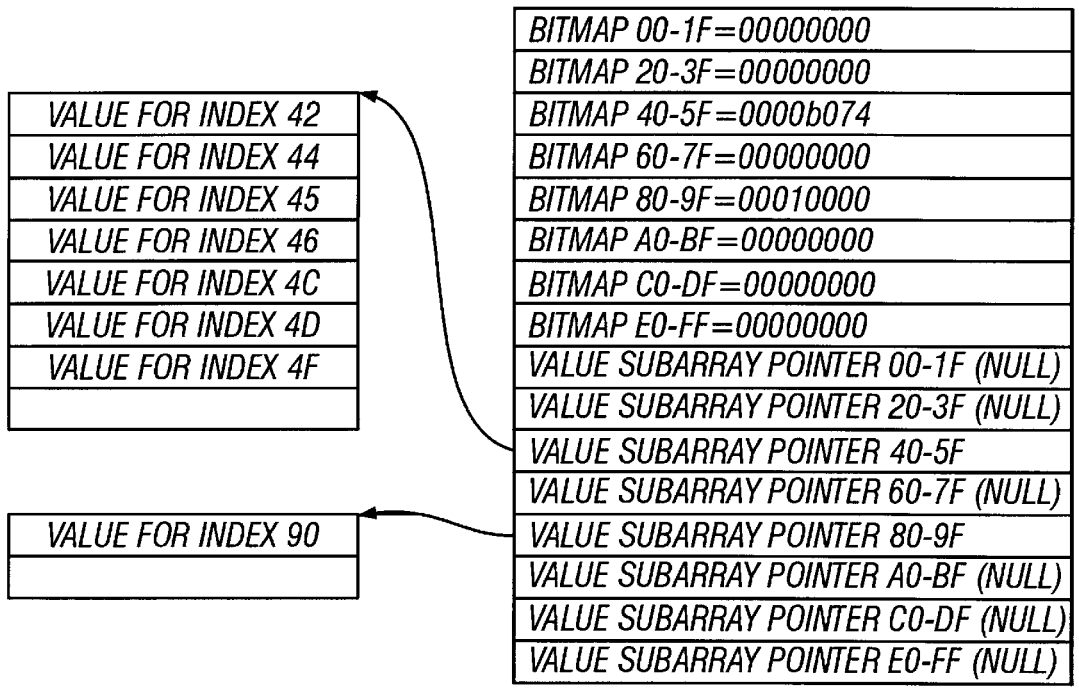
FIG. 8 is a diagram of a bitmap leaf structure for structures referencing only indexes.
FIG. 9 is a diagram of a bitmap leaf structure including values associated with respective indexes.

FIG. 9 is a diagram of a tree in which the data structure associates values with the stored indexes. As shown, a value area including one word per valid index is included in the bitmap leaf. Similar to a bitmap branch, this embodiment of the bitmap leaf is a 2-tier construct, except that the rich pointer arrays (with two words per element) are instead value area subarrays, that is, lists of values, having one word per element. On a 64-bit platform, the bitmap would instead require four words, with four words being unused. The result of using a 2-tier construct is that value list modification is faster because fewer bytes of memory and cache lines are involved.

Similar to bitmap branches, when an expanse is sufficiently small, for example, 256-way nodes with 8 bits or 1 byte remaining to decode, and the population of the expanse is sufficiently large, e.g., equal to or greater than 25 indexes, it may be advantageous (i.e., "cheaper in terms of memory") to represent the valid indexes in the expanse as a bitmap rather than as a list of indexes. This characteristic holds true only at level 1 of the tree (i.e., at leaves farthest from the root node) with just one undecoded byte per index. According to a preferred embodiment of the invention, use of bitmap leaves may be limited to level 1 leaves, that is, for indexes containing only one undecoded byte.

The data structure may further include leaf-index compression. As previously described in connection with linear leaves, traversing a digital tree involves decoding index bits (digits) representing portions (e.g., 1-byte segments) of a target index being sought, inserted or deleted. In many cases, upon reaching a leaf, some or most of the bits in the index stored at the leaf have already been decoded, that is, stored positionally (i.e., digitally) in the tree. Thus, only the remaining undecoded index bits (the suffix) must be stored in the leaf. Thus, on a 32-bit platform with 4-byte indexes decoded 1 byte at a time (i.e., at each branch of the tree), a (terminal) leaf having a size of two 64-byte wide cache lines (i.e., 128 bytes) might accommodate the number of compressed indexes shown in Table 3.

TABLE 3

| Maximum Number of Compressed Indexes per Leaf | Conditions |
|---|---|
| 128/4 = 32 | disjoint 4-byte indexes (no common leading bits) |
| 128/3 = 42 | 3-byte indexes each with 1 leading byte in common (already decoded) |
| 128/2 = 64 | 2-byte indexes each with 2 leading bytes in common (already decoded) |
| 128/1 = 128 | 1-byte indexes each with 3 leading bytes in common (already decoded) |

Referring to Table 3, in the case of 1 byte per index, once the population exceeds twenty-four indexes, a 32-byte (i.e., 256 bit) object is sufficient to hold a bitmap representing all of the 256 possible indexes in a low-level leaf. Also note that leaf-index compression has additional advantages. In particular, each lower-level leaf in the tree can hold more indexes than a current-level leaf so that, even without immediate indexes, a cascade caused by inserting a single index which overflows an existing leaf never creates more than one additional level in the tree. Similarly, a decascade caused by deleting a single index never deletes more than one level in the tree. In other words, leaf compression supports good locality of changes during modification.

As previously noted, while the present data structure has been described in terms of a fixed size index, it may be readily modified to accommodate indexes of variable sizes such as character strings and bit strings of arbitrary length. For example, using character strings of arbitrary length as indexes, a unique remaining suffix portion of a single index, if sufficiently small, may be stored immediately in a rich pointer or, if longer, stored in a variable size single-index suffix leaf.

In summary: the present invention supports fast, space-efficient "valueless" and "valued" digital trees, preferably for fixed-size indexes (keys). That is, in general there are two types of digital tree nodes according to the present invention: Branch nodes and leaf nodes. As previously described, there are three types of branch nodes that all have an identical virtual fanout (degree) of 256; that is, the digit size is fixed at one byte, that is, not necessarily "adaptable" in the sense of conforming the fanout to the data or population of the subexpanse. However, this requirement is imposed only on the more basic branch node; only the uncompressed branch type has a literal fanout of 256; linear and bitmap branches compress the branch node to match (i.e. adapt to) the actual number of populated subexpanses, with provision for opportunistic uncompression, to increase performance, when memory usage permits.

Similarly, as previously described, there are two types of leaf nodes, linear and bitmap (the latter is practical only at the lowest level of the tree), both of which are multi-index leaf nodes. A property of a digital tree is that at each lower level of the tree one less digit (byte) of each index (key) remains to be decoded, hence fewer bytes are stored in lower level leaves, resulting in "leaf index compression." When a leaf population is small enough to fit "immediately" within a rich pointer, an "immediate index" rich pointer is used rather than redirecting through a memory pointer to an actual leaf node.

Furthermore, for a "valueless" tree that does not associate a value with each index (key), when a leaf population is large enough (nearly full), an inverse leaf node could be used to save memory compared with a bitmap leaf (also only practical at the lowest level of the tree). When a leaf population is even larger, such that the number of indexes absent from the leaf's expanse (range of possible indexes) is low enough, an inverse immediate index rich pointer would be used instead. And finally, when a lowest-level subexpanse of a valueless digital tree is completely full, a full-expanse rich pointer is employed to save even more memory compared to a bitmap leaf.

To support huge numbers of very small (low-population) trees efficiently, an encoded root pointer is used. This allows the root pointer to be the same size as an ordinary pointer, with a null value (empty tree) representation the same as any ordinary null pointer. A root pointer can point directly to a root-level linear leaf, and for especially small populations it can indicate the population of the leaf to further save time and memory. Such root-level linear leaves can be accessed very quickly using "inlined" macros or function calls, wherein the calling application need not know the details of the structure it is accessing. For higher-population trees the data structure "scales up" such that the root pointer points to an information node which is global to the data structure (tree) and carries useful information about it.

Note that all rich pointer types except null and immediate index rich pointers contain decode and population fields along with a type field. Since the type field indicates the level of a subsidiary branch or leaf node, one or more levels in the tree may be skipped if all indexes stored in that subsidiary subexpanse have one or more leading digits (in the preferred embodiment, bytes) in common. In this case the rich pointer is referred to as a "narrow pointer", similar to bit-skipping or field-skipping in a level-compressed trie. Since the preferred embodiment of the present invention supports fixed-size indexes, the skipped digits (bytes), which are limited in number, may be encoded in the rich pointer's decode field, thereby avoiding any need to store redundant copies of entire indexes (keys) in leaf nodes to disambiguate the nodes. This further saves time and space.

A characteristic of this structure is that, while an immediate index or inverse immediate index rich pointer cannot include a narrow pointer, a fall expanse rich pointer can include a narrow pointer; that is, a full expanse can be directly "under" a narrow pointer. For example, if the application program were to store the indexes 0 through 255 on a 32-bit system, the resulting digital tree would consist of these nodes: a root pointer encoded to point to a global information node; a global information node that records a population of 256 indexes and the total memory used by the tree, and which points to a level-4 linear branch node with one populated subexpanse; and a level-4 linear branch node with one populated subexpanse. The subexpanse descriptor for this subexpanse is 0, which is the first digit (byte), in common, of all of the stored indexes. The rich pointer for this subexpanse contains a decode field containing two bytes, 00, which are the second and third bytes in common for all stored indexes in the rich pointer's subexpanse. The rich pointer's type is "full expanse". This implies that a level-1 subexpanse of 256 indexes, with byte values 0 . . . 255, is fully populated. Since the linear branch is at level 4, the implied narrow pointer skips two levels, corresponding to the two decode bytes in the rich pointer.

Thus, the present invention includes linear, bitmap, and uncompressed branch nodes, all of which can be under narrow pointers below the first level of the tree, and which contain rich pointers; linear and (at the lowest level) bitmap leaf nodes, which feature leaf-index compression and which, except for root-level linear leaves, can also be under narrow pointers; immediate indexes that reside directly in rich pointers in branch nodes to replace small subsidiary leaf nodes; for valueless trees, inverse leaf nodes and inverse immediate indexes, the former of which can also reside under narrow pointers; and also for valueless trees, full expanse rich pointers, which like immediate indexes reside directly in rich pointers, but which like linear and bitmap leaves can effectively be under narrow pointers.

FIG. 1A is a diagram of a hierarchical digital tree structure incorporating structures according to the invention. Note, the terminology used herein assumes a 32-bit implementation wherein indexes are single words, as opposed to character strings, and thereby labels the top node of a tree pointed to by the root as "level 4", children of the level 4 node are designated as "level 3" nodes, etc. On a 64-bit machine, the root pointer points to a level 8 node, children of which are at level 7, etc. Thus, the level of any branch or leaf node is equal to the number of digits (bytes) remaining to decode in the indexes stored at or below that node. This numbering scheme further has the advantage of making the lowest levels of both 32-bit and 64-bit trees the same, thereby simplifying source code required for use with trees of varying sizes. It is further noted that this convention, while representative, is for purposes of the present explanation and other conventions may be adopted including, for example, designating leaf nodes as constituting a highest (e.g., fourth) level of the tree.

In this implementation of a high-population data structure, a hybrid digital tree uses a variety of hybrid abstract data type data structures (ADTs) to maximize memory utilization efficiency while minimizing index access time. Because of the relatively large population of indexes stored in this illustration, root pointer 101 references intermediate population/memory node 102 containing information about the pointed-to tree. In turn, population/memory node 102 references a top, 256-way branch node 103, which points to 1-of-256 possible subexpanses based on decoding of a first byte of a 4-byte index. Similarly, a next byte is decoded at each level as the tree is traversed until a leaf node at level 1 is reached. Alternative ADTs provide for skipping levels of the tree (e.g., from level 3 branch node 109 directly to level 1 inverse linear leaf node 124.) Other ADTs provide for branch and leaf compression for optimizing memory efficiency and index access time so as to, in combination with the present invention, provide a highly efficient data structure applicable to both small and large sets of data.

Figure 1B:
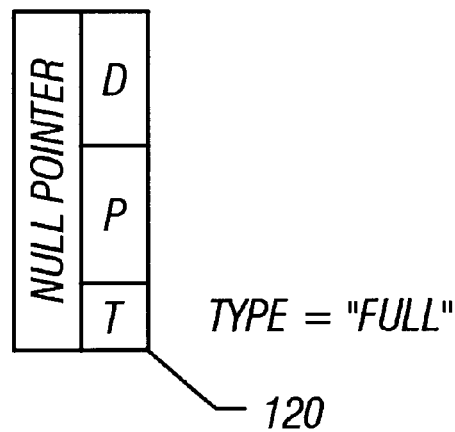
FIG. 1B is a diagram of a rich pointer structure representing a full subexpanse of indexes.
Figure 1C:
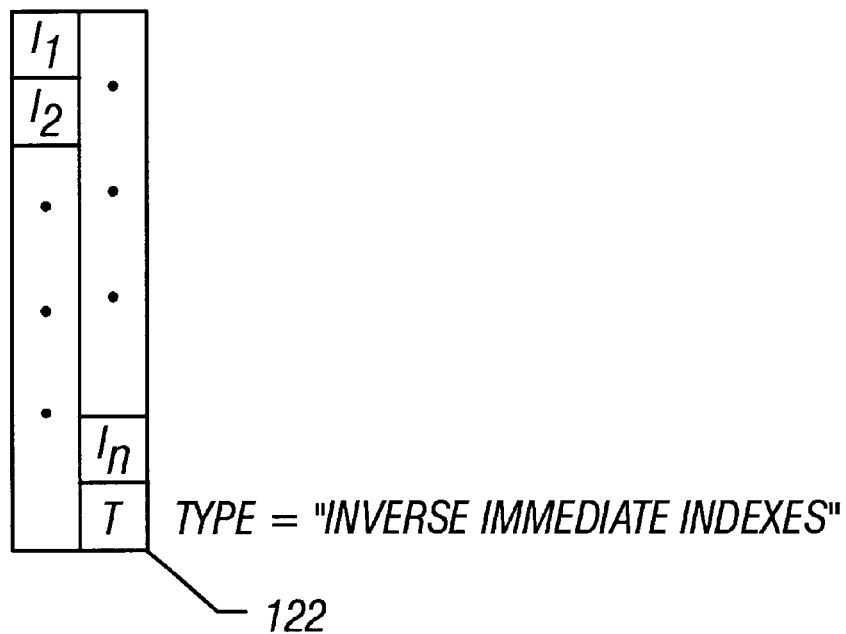
FIG. 1C is an immediate pointer indicating an inverse immediate type and storing index exceptions.
Figure 4:
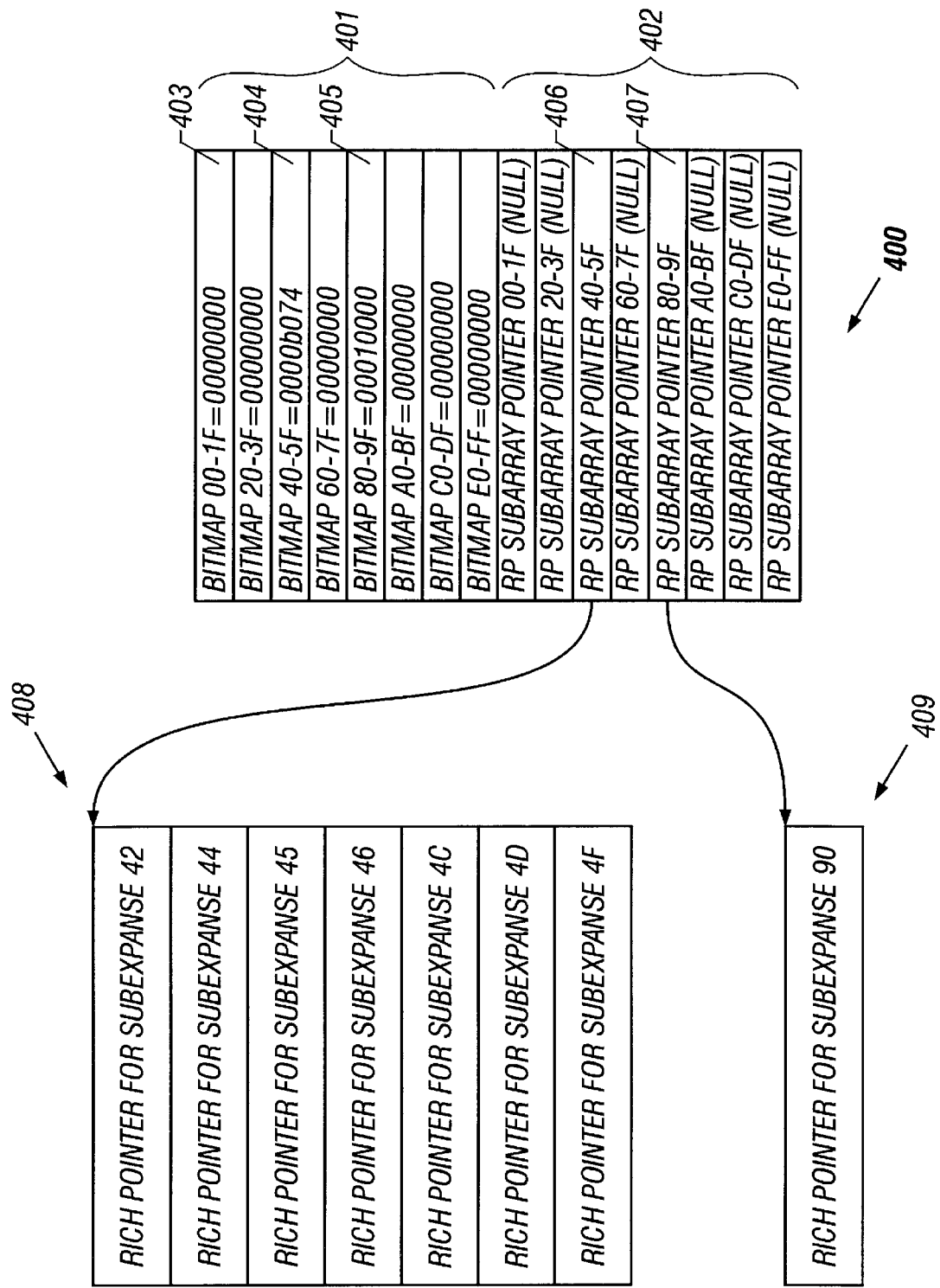

The hierarchical digital tree structure of FIG. 1A illustrates structures accommodating full and substantially full populations of indexes within a lowest level subexpanse. According to a preferred implementation of the invention, a full population (i.e., all 256 indexes valid) is indicated by rich pointer 119, having a "full" type designation 120 as shown in FIG. 1B. The "full" type indicates that the subexpanse is fully populated, i.e., in the present case, all indexes within the range of 00000200-000002FF are valid. "Nearly full" expanses of indexes (i.e., nearly fully populated expanses) may employ an inverse list structure for enumerating only invalid indexes, that is, the exceptions to an otherwise fully populated expanse of indexes. Where there are a limited number of "exceptions", the missing or invalid indexes may be indicated in an immediate structure as shown in inverse immediate index rich pointer 121 (FIG. 1A) which includes a type designation 122 (FIG. 1C) of inverse immediate indexes and lists indexes $I_l$ through $I_n$ that are missing from (i.e., that are invalid rather than valid in) the subexpanse. When the number of invalid indexes exceeds the storage available in an inverse immediate index rich pointer, an inverse leaf node 124 (FIG. 1A) is used, the associated rich pointer 115 having a type indicating an inverse leaf type and pointing to the leaf node. Note that in the normal progression of index insertion into the tree, an initially empty subexpanse represented by an absent or null rich pointer is converted to an immediate index rich pointer, then becoming a linear leaf rich pointer that points to a subsidiary linear leaf node. That is, the immediate index rich pointer is converted to a reference to a remote listing embodied in a linear leaf node. At the lowest level of the tree, a linear leaf which overflows is then converted to a bitmap leaf such as 123. When a bitmap leaf is nearly full, it may be converted to an inverse linear leaf node such as 124. As additional indexes are inserted, this inverse linear leaf node may be converted to an inverse immediate index rich pointer such as 121 in the parent branch. Finally, when the last index is inserted such that the rich pointer's expanse is full, the rich pointer is converted to the full expanse type such as 119.

Figure 10:
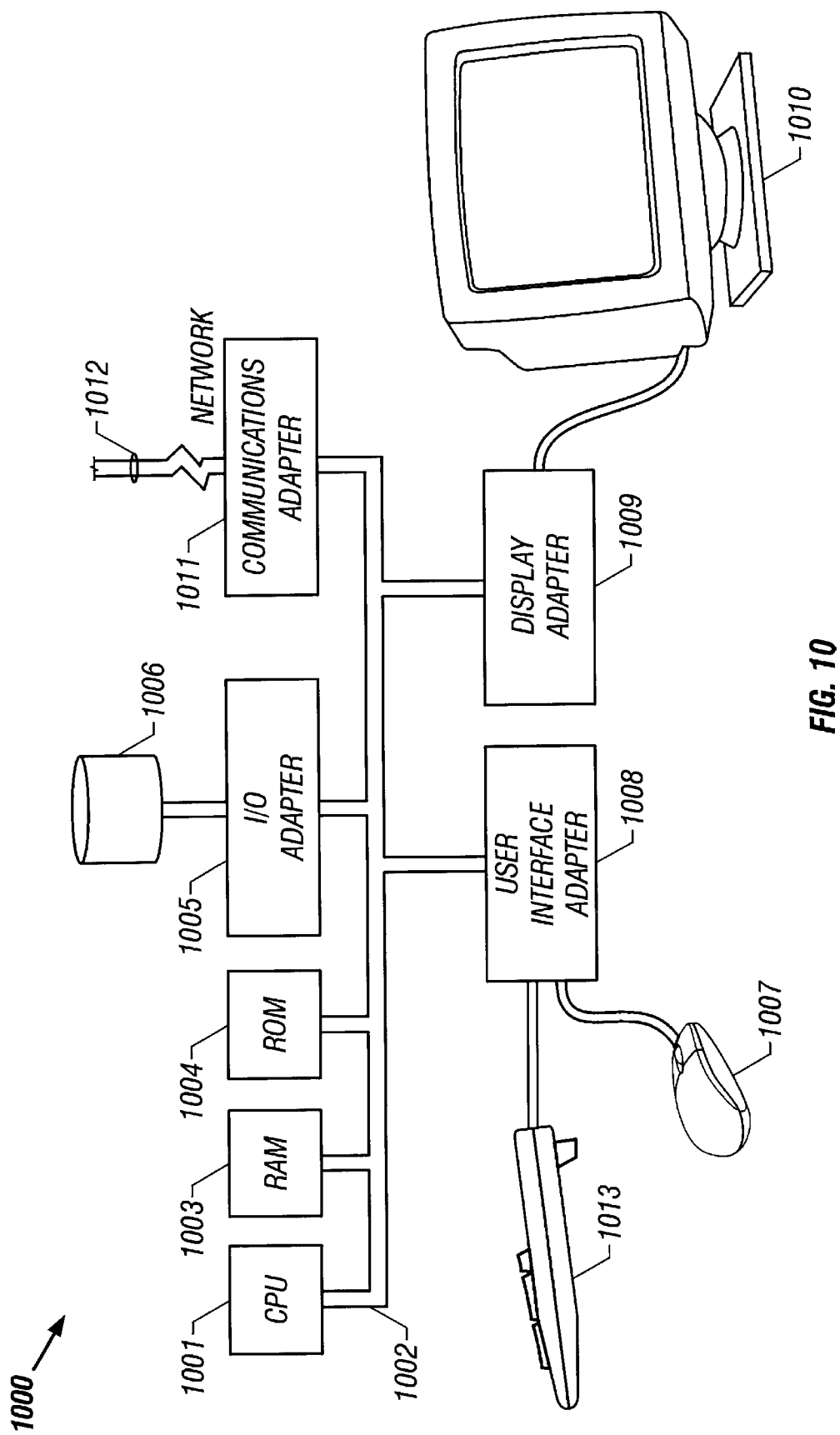
FIG. 10 is a block diagram of a computer system on which the subject digital tree may be implemented.

FIG. 10 is a diagram of a computer system capable of supporting and running a memory storage program implementing and maintaining a data structure according to the invention. Thus, although the present invention is adaptable to a wide range of data structures, programing languages, operating systems and hardware platforms and systems, FIG. 10 illustrates one such computer system 1000 comprising a platform suitable to support the present invention. Computer system 1000 includes Central Processing Unit (CPU) 1001 coupled to system bus 1002. CPU 1001 may be any general purpose CPU, such as an HP PA-8500 or Intel Pentium processor. However, the present invention is not restricted by the architecture of CPU 1001 as long as CPU 1001 supports the inventive operations as described herein, e.g., the use of pointers. System bus 1002 is coupled to Random Access Memory (RAM) 1003, which may be SRAM, DRAM or SDRAM. ROM 1004 is also coupled to system bus 1002, which may be PROM, EPROM, or EEPROM. RAM 1003 and ROM 1004 hold user and system data and programs as is well known in the art.

System bus 1002 is also coupled to input/output (I/O) controller card 1005, communications adapter card 1011, user interface card 1008, and display card 1009. The I/O card 1005 connects to storage devices 1006, such as one or more of a hard drive, a CD drive, a floppy disk drive, a tape drive, to the computer system. Communications card 1011 is adapted to couple computer system 1000 to network 1012, which may be one or more of a telephone network, a Local (LAN) and/or a Wide-Area (WAN) network, an Ethernet network, and/or the Internet network and can be wire line or wireless. User interface card 1008 couples user input devices, such as keyboard 1013 and pointing device 1007, to computer system 1000. Display card 1009 is driven by CPU 1001 to control display device 1010.

While the invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

What is claimed is:

1. A method of deleting data from a digit tree data structure comprising the steps of:

identifying a first index to be deleted from the digital tree data structure;

converting a full expanse type rich pointer into a bitmap leaf node; and deleting said first index from the digital tree data structure.

2. A method of deleting data in a digital tree data structure comprising the steps of:

identifying a first index to be deleted from the digital tree data structure;

identifying a threshold number of invalid indexes represented by an inverse linear leaf node having a subexpanse including said first index to be deleted;

converting said inverse linear leaf node into a bitmap leaf node; and deleting said first index from the digital tree data structure.

3. The method according to claim 2 further comprising the steps of:

identifying a second index to be deleted from the digital tree data structure within said subexpanse;

identifying a threshold number of invalid indexes represented by an inverse immediate index rich pointer upon insertion of said second index into said invalid indexes; and converting said inverse immediate index rich pointer into said inverse linear leaf node.

4. The method according to claim 3 further comprising the steps of:

identifying a third index to be deleted from the digital tree data structure within said subexpanse; and converting a full expanse type rich pointer into said inverse immediate index rich pointer.

5. A method of deleting data from a digital tree data structure comprising the steps of:

identifying a first index to be deleted from the digital tree data structure;

identifying a threshold number of invalid indexes represented by an inverse immediate index rich pointer representing a subexpanse including said first index;

converting said inverse immediate index rich pointer into an inverse linear leaf node representing a number of invalid indexes within said subexpanse upon insertion of said first index into said invalid indexes; and deleting said first index from the digital tree data structure.

6. The method according to claim 5 further comprising the steps of:

identifying a second index to be deleted from the digital tree data structure within said subexpanse; and converting a full expanse type rich pointer into said inverse immediate index rich pointer.

7. A method of storing data in a digital tree data structure comprising the steps of:

identifying a first index to be inserted into the digital tree data structure;

identifying a threshold number of valid indexes represented by a bitmap leaf node having a subexpanse including said first index to be inserted;

converting said bitmap leaf node into a full expanse type rich pointer; and storing said first index in the digital tree data structure.

8. A method of storing data in a digital tree data structure comprising the steps of:

identifying a first index to be inserted into the digital tree data structure;

identifying a threshold number of valid indexes represented by a bitmap leaf node having a subexpanse including said first index to be inserted;

converting said bitmap leaf node into an inverse linear leaf node representing a number of invalid indexes within said subexpanse; and storing said first index in the digital tree data structure.

9. The method according to claim 8 wherein said threshold number of indexes is equal to a number of indexes which may be stored in said inverse linear leaf node and occupy less memory than a memory requirement of said bitmap leaf node.

10. The method according to claim 8 further comprising the steps of:

identifying a second index to be inserted into the digital tree data structure within said subexpanse;

identifying a threshold number of invalid indexes represented by said inverse linear leaf node upon deletion of said second index from said invalid indexes; and converting said inverse linear leaf node into an inverse immediate index rich pointer.

11. The method according to claim 10 further comprising the steps of:

identifying a third index to be inserted into the digital tree data structure within said subexpanse;

identifying an absence of invalid indexes represented by said inverse immediate index rich pointer upon deletion of said third index from said invalid indexes; and converting said inverse immediate index rich pointer into a full expanse type rich pointer.

12. The method according to claim 8 further comprising the steps of:

representing a plurality of valid indexes within said subexpanse using linear leaf node;

identifying a second index to be inserted into the digital tree structure within said subexpanse;

identifying a threshold number of said plurality of valid indexes within said subexpanse using said linear leaf node;

converting said linear leaf node into a bitmap leaf node including said second index.

13. A method of storing data in a digital tree data structure comprising the steps of:

identifying a first index to be inserted into the digital tree data structure;

identifying a threshold number of invalid indexes represented by an inverse linear leaf node representing a subexpanse including said first index;

converting said inverse linear leaf node into an inverse immediate index rich pointer representing a number of invalid indexes within said subexpanse upon deletion of said first index; and storing said first index in the digital tree data structure.

14. The method according to claim 13 further comprising the steps of:

identifying a second index to be inserted into the digital tree data structure within said subexpanse;

identifying an absence of invalid indexes represented by said inverse immediate index rich pointer upon deletion of said second index from said invalid indexes; and converting said inverse immediate index rich pointer into a full expanse type rich pointer.

15. A digital tree data structure stored on a computer readable media, comprising:

instructions executable to form a branch node including a plurality of rich pointers referencing respective subexpanses, at least one of said subexpanses being fully populated with a plurality of said indexes and a corresponding one of said rich pointers associated with said fully populated subexpanse including an indication that said subexpanse is full.

16. Computer readable media storing instructions executable to form a digital tree data structure storing indexes comprising:

a branch node including a plurality of rich pointers referencing respective subexpanses, at least one of said subexpanses being fully populated with a plurality of said indexes and a corresponding one of said rich pointers associated with said fully populated subexpanse including an indication that said subexpanse is full.

17. Computer readable media storing instructions executable to form a digital tree data structure storing indexes comprising:

a branch node including a plurality of rich pointers referencing respective subexpanses, at least one of said subexpanses being not fully populated with a plurality of said indexes and a corresponding one of said rich pointers associated with said not fully populate subexpanse including an indication that said subexpanse is not full.

18. The computer readable media according to claim 17 wherein said one rich pointer further includes an indication of invalid ones of aid indexes within said not fully populated subexpanse.

19. The computer readable media according to claim 18 wherein said one rich pointer further includes a list of said invalid ones of said indexes.

20. The computer readable media according to claim 17 wherein said one rich pointer further includes a reference to a remote listing of invalid ones of said indexes with said not fully populated subexpanse.

21. The computer readable media according to claim 20 wherein said reference comprises a simple pointer and said remote listing comprises an inverse linear leaf node pointed to by said simple pointer.

* * * * *